United States Patent
Toyoda (10) Patent No.: US 10,857,849 B2
(45) Date of Patent: Dec. 8, 2020

(54) VEHICLE INTENT COMMUNICATION BASED ON VEHICLE POSTURE

(71) Applicant: TOYOTA MOTOR ENGINEERING & MANUFACTURING NORTH AMERICA, INC., Erlanger, KY (US)

(72) Inventor: Heishiro Toyoda, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 218 days.

(21) Appl. No.: 15/899,525

(22) Filed: Feb. 20, 2018

(65) Prior Publication Data

US 2019/0255902 A1   Aug. 22, 2019

(51) Int. Cl.
| | | |
|---|---|---|
| *B60G 17/016* | (2006.01) | |
| *B60G 17/018* | (2006.01) | |
| *B60G 17/04* | (2006.01) | |
| *G06N 20/00* | (2019.01) | |

(52) U.S. Cl.
CPC ......... *B60G 17/016* (2013.01); *B60G 17/018* (2013.01); *B60G 17/0416* (2013.01); *G06N 20/00* (2019.01); *B60G 2202/152* (2013.01); *B60G 2600/1876* (2013.01); *B60G 2800/01* (2013.01)

(58) Field of Classification Search
CPC .................................................... B60G 17/016
See application file for complete search history.

(56) References Cited

U.S. PATENT DOCUMENTS

| | | | |
|---|---|---|---|
| 4,661,035 A * | 4/1987 | Danielsson | A61G 3/062 414/550 |
| 9,475,422 B2 | 10/2016 | Hillis et al. | |
| 9,702,349 B2 * | 7/2017 | Anderson | B60G 17/019 |
| 10,315,481 B2 * | 6/2019 | Lu | B60G 17/015 |
| 10,486,485 B1 * | 11/2019 | Levinson | B60G 17/0182 |
| 2007/0045022 A1 * | 3/2007 | Greig | B62D 37/00 180/215 |
| 2007/0063502 A1 * | 3/2007 | Greig | B62K 5/025 280/771 |
| 2009/0108671 A1 * | 4/2009 | Maeda | B60G 7/008 303/146 |
| 2010/0004820 A1 * | 1/2010 | Bekoscke | A61G 5/043 701/38 |
| 2012/0078572 A1 * | 3/2012 | Bando | G08G 1/0112 702/150 |
| 2012/0283929 A1 * | 11/2012 | Wakita | A61G 5/04 701/99 |
| 2013/0207364 A1 * | 8/2013 | Bekoscke | A61G 5/10 280/124.104 |
| 2014/0005889 A1 * | 1/2014 | Hayakawa | B60G 17/01933 701/38 |
| 2014/0049012 A1 * | 2/2014 | Ono | B60G 17/021 280/5.514 |

(Continued)

*Primary Examiner* — Alex C Dunn
(74) *Attorney, Agent, or Firm* — Oblon, McClelland, Maier & Neustadt, L.L.P.

(57) ABSTRACT

Aspects of the disclosure provide a method for communicating motion intention of a vehicle to other road users. The method can include receiving a signal indicating a motion intention of the vehicle, and controlling a suspension system of the vehicle to create a vehicle posture according to the motion intention of the vehicle to show the motion intention of the vehicle to other road users.

23 Claims, 5 Drawing Sheets

(56) References Cited

U.S. PATENT DOCUMENTS

| | | |
|---|---|---|
| 2014/0118132 A1 | 5/2014 | Braunberger et al. |
| 2015/0198440 A1* | 7/2015 | Pearlman .............. G01S 17/023 356/4.01 |
| 2017/0056261 A1* | 3/2017 | Vereen, III ............. A61G 5/107 |
| 2017/0136295 A1* | 5/2017 | Tholkes ............. A63B 22/0664 |
| 2017/0136842 A1* | 5/2017 | Anderson .......... B60G 17/0165 |
| 2017/0240096 A1 | 8/2017 | Ross et al. |
| 2017/0240098 A1 | 8/2017 | Sweeney et al. |
| 2017/0349003 A1* | 12/2017 | Joso ....................... B60G 15/12 |
| 2018/0053114 A1* | 2/2018 | Adjaoute ............... G06N 7/005 |
| 2019/0011914 A1* | 1/2019 | Park ..................... B60W 40/08 |
| 2019/0049977 A1* | 2/2019 | Dean ................... G05D 1/0255 |

\* cited by examiner

VEHICLE INTENT COMMUNICATION BASED ON VEHICLE POSTURE

TECHNICAL FIELD

The subject matter described herein relates to communicating vehicle motion intent to other road users.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In addition to standard signals for conveying a motion intention, such as turn signals, brake lights, horn, and headlights, road users may rely on actions or gestures to communicate their intentions with each other. For example, a pedestrian can use eye contact with an approaching driver to ensure the driver sees the pedestrian and crossing a street is safe. A driver intending to merge from a side street onto a main street with heavy traffic can use eye contact with a driver on the main street to make sure he or she can turn onto the main street. A driver may wave a hand to a pedestrian at a road intersection to indicate the pedestrian can proceed to a crosswalk.

However, there are scenarios that communication based on a driver's actions or gestures cannot occur, and motion intent of a vehicle or a driver cannot be conveyed or observed. For example, for an autonomous vehicle, a driver may be absent from the vehicle, or a person in a driver's seat may be preoccupied with other activities when the vehicle operates in an autonomous mode. For non-autonomous vehicles, a driver's action or gesture may not be observed, for example, due to light deflection from the windshield of the vehicle.

Some solutions are developed to solve the above vehicle intent communication problem. For example, a method for an autonomous vehicle to communicate with external observers is described in U.S. Pat. No. 9,475,422. In this method, a projector is employed to project a human understandable output to a ground surface in proximity to the autonomous vehicle. In U.S. Patent Pub. No. 20170240098, methods for generating auditory and visual signals to communicate vehicle intentions are disclosed. In addition to a projector, display panels, and lighting strips disposed on the side or rooftop of the vehicle are employed. In those solutions, additional devices are added to a vehicle in order to create signals for communication of vehicle intent. Those additional devices can cause additional cost and mass to a vehicle.

SUMMARY

Aspects of the disclosure provide a method for communicating motion intention of a vehicle to other road users. The method can include receiving a signal indicating a motion intention of the vehicle, and controlling a suspension system of the vehicle to create a vehicle posture according to the motion intention of the vehicle to show the motion intention of the vehicle to other road users.

For example, an inclined posture towards the front of the vehicle can be created to show the vehicle intends to stop or keep stopping. An inclined posture towards the rear of the vehicle can be created to show the vehicle intends to start. An inclined posture towards the left of the vehicle can be created to show the vehicle intends to turn right. An inclined posture towards the right of the vehicle can be created to show the vehicle intends to turn left. In one example, a dynamic posture including a forward inclined posture followed by a flat posture can be created.

For example, a vehicle posture can be created by extending or shrinking an aspect of the suspension system. An inclined posture towards the front of the vehicle can be created by shrinking a front suspension and/or extending a rear suspension of the suspension system. An inclined posture towards the rear of the vehicle can be created by shrinking a rear suspension and/or extending a front suspension of the suspension system. An inclined posture towards the left of the vehicle can be created by shrinking a left side suspension and/or extending a right side suspension of the suspension system. An inclined posture towards the right of the vehicle can be created by shrinking a right side suspension and/or extending a left side suspension of the suspension system.

In various examples, the suspension system can be one of a suspension system based on airbags, a hydro-pneumatic suspension system, and an active suspension system based on high-speed actuators. In various examples, the signal indicating the motion intention of the vehicle can be received from an autonomous driving system, a driver intention monitoring system, or an input device configured to receive a driver's input of a motion intention.

Aspects of the disclosure provide a vehicle that can communicate motion intention to other road users by creating vehicle postures. The vehicle can include a suspension system, and a vehicle posture controller. The vehicle posture controller can be configured to receive a signal indicating a motion intention of the vehicle, and control the suspension system of the vehicle to create a vehicle posture according to the motion intention of the vehicle to show the motion intention of the vehicle to other road users.

Aspects of the disclosure provide a non-transitory computer readable medium. The medium can store instructions that, when executed by a processor, causes the processor to perform the method for communicating motion intention of a vehicle to other road users.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Aspects of the disclosure describe methods and apparatus for communicating motion intent of a vehicle by creating suitable vehicle postures. The motion intent or motion intentions can refer to actions that the vehicle intends to perform. The vehicle postures can be created by manipulating a suspension system of the vehicle. For example, a vehicle can be equipped with an air suspension system. The air suspension system can include four air suspensions (such as air springs, also referred to as air bags or air bellows) installed at four corners of the vehicle body. Each air suspension can be independently controlled to extend or shrink such that height of the vehicle body at a respective corner can be separately adjusted.

Accordingly, different vehicle postures can be created by manipulating the air suspensions. For example, a forward inclined posture can be created by shrinking the front air suspensions and/or extending the rear suspensions. Similarly, a backward inclined posture, or a left or right inclined posture can be created. Various such created postures can be associated with different motion intentions of the vehicle, and used for conveying different motion intentions. For examples, a forward inclined posture can be used to indicate an intention of stopping or keeping stopping, while a backward included posture can be used to indicate an intention of starting.

FIGS. 1A-1H show examples of scenarios where different vehicle postures are used to communicate various vehicle motion intentions. The vehicles demonstrating intentions in the examples (represented as rectangles filled with diagonal lines) can be an autonomous vehicle or a normal vehicle with a human driver. In the examples, an intended travelling route of a road user, such as a vehicle, or a pedestrian, is indicated by an arrow.

Figure 1A:
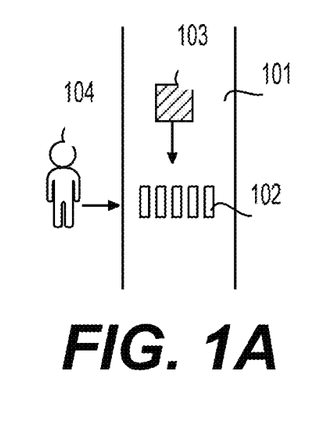
FIGS. 1A-1H show examples of scenarios where different vehicle postures are used to communicate various vehicle motion intentions according to some embodiments of the disclosure.

FIG. 1A shows a stretch of road 101 with a crosswalk 102. A pedestrian 104 standing by the crosswalk 102 is going to cross the road 101. A vehicle 103 approaching the crosswalk will slow down and stop before the crosswalk to allow the pedestrian to cross. To demonstrate an intention to stop, the vehicle 103 may show an inclined posture towards the front of the vehicle 103 while approaching the crosswalk 102 until fully stops before the crosswalk 102. The forward inclined posture ensures the pedestrian 104 that the vehicle 103 sees the pedestrian 104 and crossing the road 101 would be safe. While the pedestrian 104 is crossing the crosswalk 102, the vehicle 103 may maintain the forward inclined posture to show an intention to keep stopping.

Alternatively, the vehicle 103 may create a dynamic posture to show the vehicle 103 intends to wait for a longer time. A dynamic posture can refer to a sequence of postures that are shown subsequently to convey a specific vehicle motion intention. In contrast to the dynamic postures, a single posture, such as a forward or backward inclined posture, can be referred to as a static posture. For example, after arriving at the crosswalk 102, the vehicle 103 may change the posture from the forward inclined posture to a flat posture, for example, by adjusting suspensions to maintain the vehicle body in a flat position. This dynamic posture may enhance the pedestrian's feeling of security.

Figure 1B:
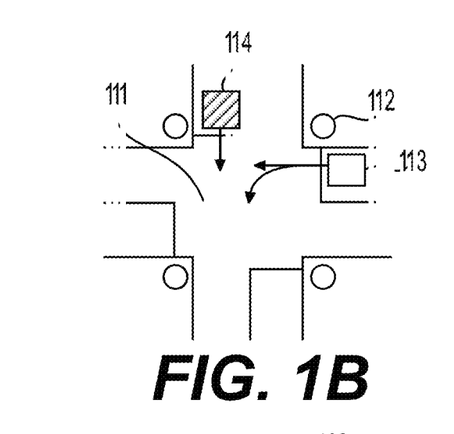

FIG. 1B shows a four-way stop intersection 111 with stop signs 112 at each entrance to the intersection 111. Two vehicles 113-114 approaching the intersection 111 reach the intersection simultaneously. The vehicle 114 may show a forward inclined posture while approaching the intersection and maintain the forward inclined posture to demonstrate an intention to yield the right-of-way to the vehicle 113. A driver of the vehicle 113 can see the forward inclined posture of the vehicle 114, and interpret the forward inclined posture as an offer to yield and proceed to drive the vehicle passing through the intersection 111 or turning left.

Alternatively, the vehicle 114 may decide to take the right-of-way and intend to move forward. Accordingly, the vehicle 114 may create a backward inclined posture to demonstrate the intention to start to enter the intersection 114. The driver of the vehicle 113 may observe the backward inclined posture, and be aware of the vehicle 114's intention to move. The vehicle 113 may thereby hold its position waiting for its turn to move.

Figure 1C:
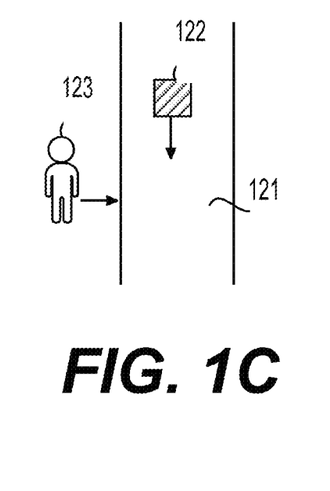

FIG. 1C shows a segment of road 121. A pedestrian 123 intends to cross the road 121 while a vehicle 122 moves towards the direction of the pedestrian 123. The vehicle 122 may detect the pedestrian 123 intending to cross the road 121. The vehicle 122 may decide to pass without yielding to the pedestrian 123. Accordingly, the vehicle 122 can create a backward inclined posture to demonstrate an intention to keep moving. The pedestrian 123 can take the backward inclined posture as an alert that the vehicle 122 would not yield to the pedestrian 123.

Figure 1D:
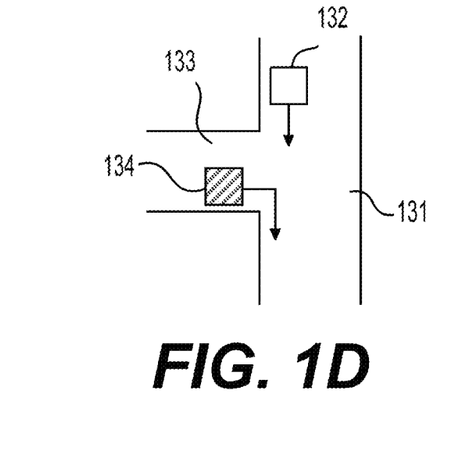

FIG. 1D shows a side street 133 connected with a main street 131 with heavier traffic. A vehicle 134 intends to merge into the traffic on the main street 131. Accordingly, the vehicle 134 can create a backward inclined posture to show an intention to start. A driver of a vehicle 132 can see the backward inclined posture of the vehicle 134 and reduce speed accordingly to let the merging vehicle 134 to join the traffic.

Figure 1E:
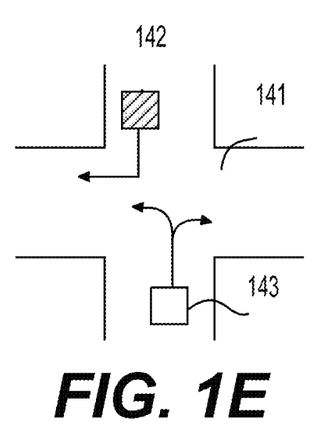

FIG. 1E shows a four-way intersection 141. Two vehicles 142-143 approach the intersection 141 from opposite directions. The vehicle 142 intends to make a right turn, and accordingly can create an inclined posture towards the left side of the vehicle 142 to convey the intention of turning right. The vehicle 143 (or a driver of the vehicle 143) can see the inclined posture of the vehicle 142, and respond accordingly. For example, assuming the vehicle 143 intends to make a left turn, the vehicle 143 can wait until the intersection is clear. If the vehicle 143 intends to make a right turn, the vehicle 143 can proceed to turn right without stopping.

Figure 1F:
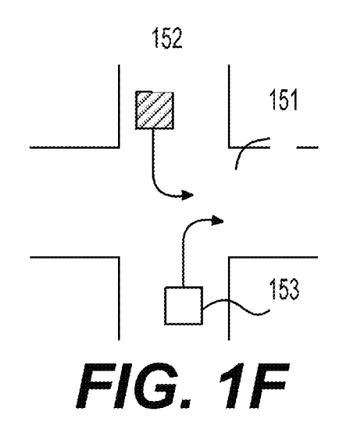

FIG. 1F shows a four-way intersection 151. Two vehicles 152-153 approach the intersection 151 from opposite directions. The vehicle 152 can reach the intersection 151 earlier than the vehicle 153, and intend to turn left before the opponent vehicle 153 reaches the intersection 151. Accordingly, the vehicle 152 can create an inclined posture towards the right side of the vehicle 152 to show an intention of turning left. The vehicle 153 can see the inclined posture and know the vehicle 152 intends to turn left. The vehicle 153 can thereby be cautious when approaching the intersection 151.

Figure 1G:
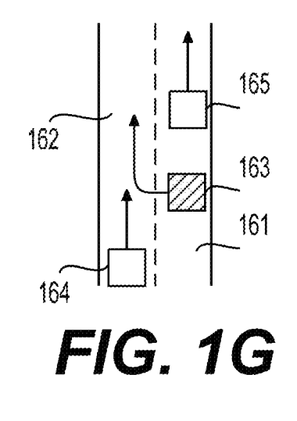

FIG. 1G shows two parallel lanes 161-162 for traffic going to a same direction. A vehicle 163 intends to change lane from right to left in order to overtake a vehicle 165 moving in front of the vehicle 163. The vehicle 163 can create an inclined posture towards the right side of the vehicle 163 to signal an intention to switch lane from right to left to a vehicle 164 coming from behind.

Figure 1H:
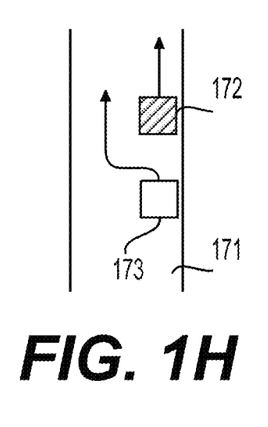

FIG. 1H shows a stretch of road 171 where a vehicle 173 follows another vehicle 172. The vehicle 172 may intend to reduce speed in order to look for an available parking spot along the side of the road 171. Accordingly, the vehicle 172 may create a forward inclined posture (or an inclined posture towards left) to convey an intention of slowing down to the following vehicle 173. The vehicle 173 may see the forward inclined posture, and as a response overtake the vehicle 172.

It is to be understood that using vehicle posture to communicate vehicle motion intent is not limited to the scenarios described herein. In addition, vehicle postures are not limited to the postures described in the above examples. For example, inclined postures towards front-left, front-right, rear-left, or rear-right of a vehicle can be created, or various dynamic postures can be created, for different use scenarios. Further, association between a vehicle posture (including a dynamic posture) and a vehicle motion intention can vary according to different factors. For example, a same posture can be used to represent different intentions in different contexts as shown in the examples of FIGS. 1A-1H. A same posture can be interpreted in different way in different cultures or different countries. Some associations between vehicle postures and vehicle motion intentions can be standardized while other associations may be adopted as a local custom of road users.

In some examples, the postures of motion intentions can be learned by an artificial intelligence (AI) function. For example, leveraging the learning capability of this AI function, based on sensors for autonomous driving, a vehicle can voluntarily understand how postures are utilized in different cultures or countries.

The vehicle postures created by manipulating a suspension system can be used in autonomous vehicles as well as non-autonomous vehicles. Compared with the solutions where additional display devices or signaling devices are used for communicating vehicle intent, creating vehicle postures with a suspension system can avoid adding additional cost and mass to a vehicle. In addition, the vehicle postures described herein are more intuitive and easier to understand by other road users compared with the additional display devices or signaling devices. Further, compared with the standard signals for conveying an intention, such as turn signals, brake lights, and the like, the vehicle postures are more significant and not easy to be neglected for road users.

Figure 2:
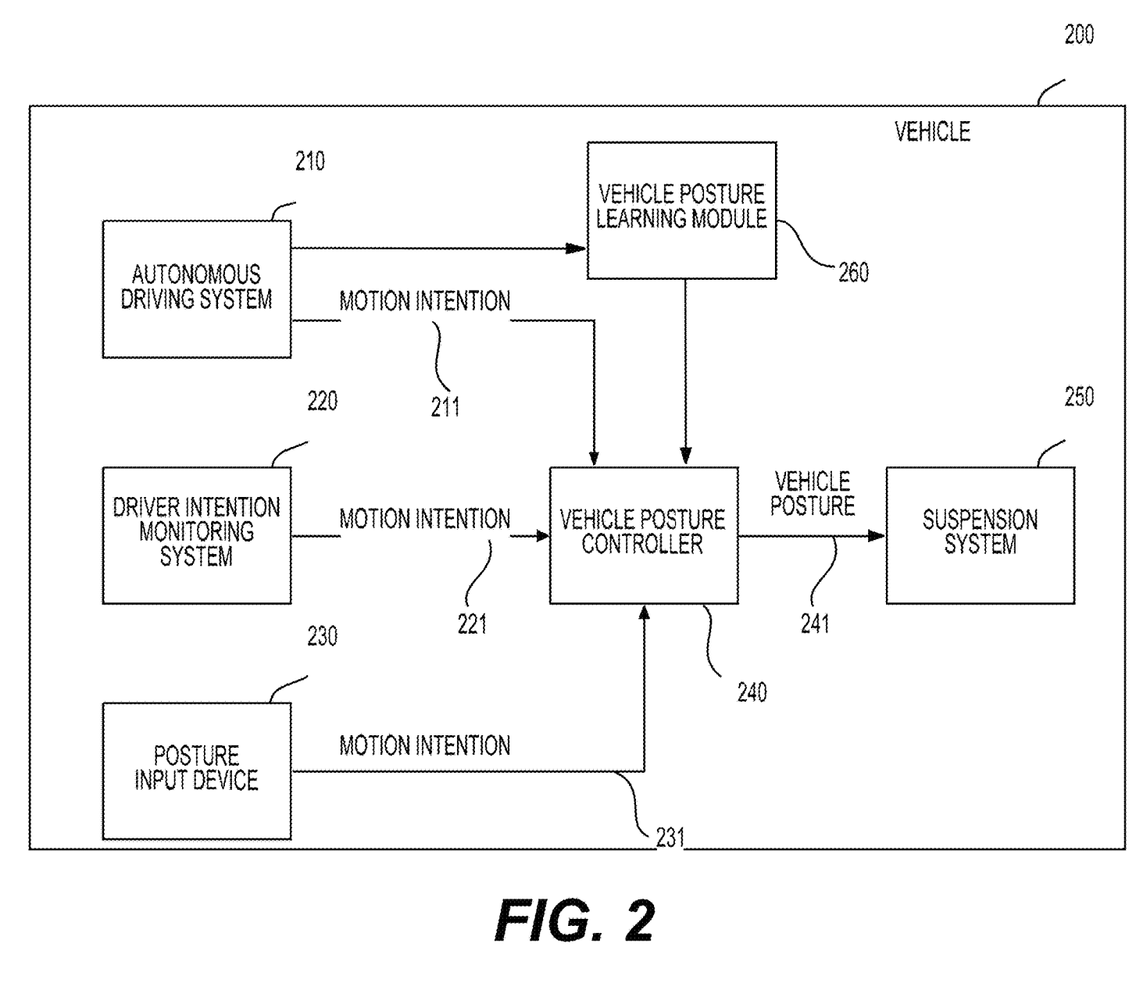
FIG. 2 shows an example vehicle according to some embodiments of the disclosure.

FIG. 2 shows an example vehicle 200 according to some embodiments of the disclosure. The vehicle 200 can be configured to control a suspension system 250 to create various postures according to different motion intentions of the vehicle 200. The vehicle 200 can be a car, a truck, a bus, and the like, configured with a suspension system. In one example, the vehicle 200 includes an autonomous driving system 210, a driver intention monitoring system 220, a posture input device 230, a vehicle posture controller 240, a vehicle posture learning module 260, and the suspension system 250. Those components are coupled together as shown in FIG. 2.

The autonomous driving system 210 can be configured to make decisions regarding actions to be performed in response to surrounding environment during a trip, and generate signals 211 indicating motion intentions corresponding to the decisions. For example, the autonomous driving system 210 can be configured to perform various driving functions automatically without a human intervention. For example, the autonomous driving system 210 can include a navigation system. Based on input of a destination, a digital map, and positioning information (e.g., provided from a Global Positioning System (GPS) receiver), the navigation system can continuously determine travel directions for the vehicle 200 during the trip. Accordingly, the autonomous driving system 210 can issue operational commands and control an operating system, for example, including a steering system, a braking system, a throttling system, and the like, to control the vehicle 200 to travel towards the destination.

In one example, the autonomous driving system 210 can know its surrounding environment based on its current position and road information on the digital map during a trip. For example, the digital map may provide road information of intersections, crosswalks, stop signs, signal lights, lane configurations, a joint of a side street and a main street, parking spots arrangement, and the like. Accordingly, the autonomous driving system 210 can know that road information in advance.

In one example, the autonomous driving system 210 can know its surrounding environment in real time based on various sensors. For example, the autonomous driving system 210 can include sensors and sensor data processing circuitry. For example, the sensors can include cameras, lidars, radars, microphones, and the like, that are configured to monitor the environment of the vehicle 200. For example, a camera may capture an image or video of other road users, such as other vehicles, pedestrians, cyclists, and the like. The sensor data processing circuitry can be configured to process the image or video data to recognize the road users. As a result, other road users can be detected. In some examples, based on actions or postures of other road users, intentions of those road users can also be estimated and detected. For example, a camera may capture an image or video of a segment of road or an intersection. Accordingly, detailed and real time information of the road or intersection can be obtained that may not be included in the digital map.

Based on information of the environment of the vehicle 200, for example, obtained from the digital map or various sensors, the autonomous driving system 210 can determine various to-be-performed actions. For example, the autonomous driving system 210 may determine to slow down when reaching a four-stop intersection, or upon detection of a pedestrian standing by a crosswalk. The autonomous driving system 210 may determine to yield when the vehicle 200 and another vehicle arrive at an intersection simultaneously. Alternatively, the autonomous driving system 210 may determine to start to move in advance of the other vehicle when the vehicle 200 has the right-of-way.

Corresponding to various to-be-performed actions, the autonomous driving system 210 can generate signals 211 indicating motion intentions of the autonomous driving system 210. In some examples, not all to-be-performed actions will trigger transmission of a motion intention signal. For which actions a motion intention is signaled to the vehicle posture controller 240 can be configurable. For example, when stuck in a traffic jam, or no other road users are detected in surrounding environment, motion intention signals may not be produced for actions of reducing or increasing speed.

The driver intention monitoring system 220 can be configured to monitor a driver of the vehicle 200 and generate motion intention signals 221 corresponding to driver's intentions. For example, a driver may operate the vehicle 200 manually without using the autonomous driving system 210. Or, the driver may take over a part of driving functions of the autonomous driving system 210 in some special scenarios where autonomous driving system 210 cannot operate properly. For example, the driver may operate manual driving devices, such as a steering wheel, a brake pedal, an acceleration pedal, and the like, to control the vehicle 200.

In one example, the driver intention monitoring system 220 can include various sensors for monitoring actions of the driver. For example, one or more cameras can be used to monitor facial expression, eye movement, and body movement of the driver. Suitable sensors can be used to monitor movement of the manual driving devices (steering wheel, brake pedal, acceleration pedal, and the like) to detect operations of the driver. The driver intention monitoring system 220 can process sensory data collected from those sensors, and accordingly predict actions the driver intends to take. Based on the predicted actions, the motion intention signals 221 indicating the driver's intentions can be generated. Similarly, which intentions of the driver will trigger a motion intention is configurable in some examples.

The posture input device 230 can be configured to receive an input indicating a motion intention from a driver of the vehicle 200. In one example, the posture input device 230 includes a set of button, or a touch panel which the driver can manually operate to indicate a motion intention of the driver. In one example, the posture input device 230 includes a microphone and capable of voice recognition. Accordingly, the driver can input a motion intention by issuance of an audio command. Based on the received input of the driver, the posture input device 230 can generate motion intention signals 231 indicating intentions of the driver.

While three components 210-230 generating motion intention signals are included in the vehicle 200 in FIG. 2, vehicles in other examples may include one or two of the three components 210-230. For example, a non-autonomous vehicle may include the driver intention monitoring system 220, the posture input device 230, or both. In further examples, other components or devices other than the components 210-230 may be employed to generate motion intention signals.

The vehicle posture controller 240 can be configured to receive a signal 211-231 indicating a motion intention and accordingly create a vehicle posture corresponding to the motion intention. In one example, the vehicle posture controller 240 can generate a signal 241 indicating the vehicle posture corresponding to the motion intention according to a configuration. For example, the configuration can specify association between various motion intentions and various vehicle postures. As described above, multiple factors may affect mappings between motion intentions and vehicle postures. Accordingly, the association configuration can vary according to specific situations. Corresponding to the posture signal 241, the suspension system 250 can interpret the posture signal 241, for example, by using a suspension controller. For example, the suspension controller can accordingly generate suitable actuation signals to adjust respective suspensions to form the vehicle posture indicated by the signal 241. For example, an actuation signal can be used to control a solenoid valve to inflate or deflate an air spring.

In one example, instead of generating the posture signal 241, corresponding to the motion intention indicated by the signals 211-231, the vehicle posture controller 240 can generate actuation signals to directly control suspensions of the suspension system 250 to create a vehicle posture. In this scenario, by configuration, each motion intention can be mapped to a set of parameters indicating the to-be-generated actuation signals.

The vehicle posture learning module (VPLM) 260 can be configured to learn usage of vehicle postures using AI technology. For example, the VPLN 260 can include an AI unit capable of learning vehicle intention postures based on sensors of the autonomous driving system 210. For example, when the vehicle 200 enters a foreign country, the VPLM 260 can detect usage of vehicle postures is different from its original country, and learn how vehicle intention postures are used in this foreign country. The VPLM 260 can accordingly control the vehicle posture controller 240 to use vehicle postures in a same way as the local vehicles.

For example, as a result of a learning process, the VPLM 260 can determine vehicle postures used in various scenarios, and mapping relationship between motion intentions and respective vehicle postures. In one example, a learning process can include the following steps. At a first step, the VPLM 260 can detect differences between a foreign region and its original region. For example, by observation using the sensors for autonomous driving, the VPLM 260 can detect that vehicle postures are different, and/or association between vehicle postures and motion intentions are different. At a second step, the VPLM 260 can identify the postures (dynamic or static) by observation. At a third step, the VPLM 260 can identify motions or motion intentions corresponding to different vehicle postures. At a fourth step, the VPLM 260 can identify associations between the vehicle postures and the motions or motion intentions.

After the learning process, the VPLM 260 can provide the learning results to the vehicle posture controller 240. For example, the VPLM 260 may translate each newly leant posture to a set of parameters for generating suspension system control signals, and provide the parameters to the vehicle controller 240. The VPLM 260 can further provide mapping relationship between motion intentions and the newly leant vehicle postures to the vehicle controller 240. Based on the above provided information, the vehicle posture controller 240 can start to use vehicle intention postures in a way the same as the local vehicles. While a foreign country is used as an example for explanation of the function of the VPLM 260, the learning operation is not limited to foreign countries. For example, a vehicle can learn any usage of postures that are not included in its current configurations.

In addition, in some examples, the VPLM 260 is configured to learn timings of expressing intentions. For example, based on observations of timings of other vehicles expressing intentions, the VPLM 120 can learn the timings. The VPLM 260 can accordingly control the vehicle posture controllers 240 to express a posture according to leant timing.

The suspension system 250 is configured to adjust suspensions to create a vehicle posture in response to receive an input from the vehicle posture controller 240. For example, the suspension system 250 can include a plurality of suspensions disposed at different positions with respect to a chassis (frame) of the vehicle 200. For example, the vehicle 200 can be installed with four suspensions (front-left, front-right, rear-left and rear-right). Each of the four suspensions can be extended or shrunk independently. By extending or shrinking the four suspensions, a vehicle posture, such as a forward inclined posture, a backward inclined posture, a left-side inclined posture, a right-side inclined posture, and the like can be created.

In one example, in order to create a forward inclined posture, the two rear suspensions of the vehicle 200 are extended while the two front suspensions are maintained at an original state. In another example, in order to create a forward inclined posture, the two rear suspensions of the vehicle 200 are extended while the two front suspensions are shrunk. As can be seen, a same vehicle posture can be created with different suspension adjustment operations.

In one example, the suspension system 250 is configured to receive a signal 241 indicating a vehicle posture and accordingly generate actuation signals, for example, by a suspension controller, to adjust suspensions of the suspension system 250 to create the vehicle posture. In one example, the suspension system 250 is configured to receive actuation signals corresponding to a vehicle posture. The actuation signals can be used to extend or shrink suspensions of the suspension system 250.

In various examples, the suspension system 250 can be of various types employing various suspension schemes. In one example, the suspension system 250 can be an air spring based suspension system. For example, a suspension of such air suspension system can include an air spring (also referred to as an air bag, or an air bellow) which can be shrunk by deflating compressed air from the air spring, or extended by inflating compressed air into the air spring. In one example, the suspension system 250 can be a hydro-pneumatic suspension system. For example, a suspension of such hydro-pneumatic suspension system can include a suspension chamber connected with a movable piston. By pumping oil in and out of the suspension chamber, the piston can moves down or up, resulting in the vehicle body moving vertically.

In a further example, the suspension system 250 can be an active suspension system. For example, an active suspension system can use a controller and sensors to instantly adapt suspensions to road conditions. For example, a suspension of an active suspension system can include a fast-response high-power actuator that can be extended or shortened instantly. In various examples, the actuator can be a hydraulic actuator including a pump, a vale, and a cylinder, an electromagnetic actuator including two electromagnets placed with like poles facing each other, a linear electromagnetic motor, and the like.

Figure 3:
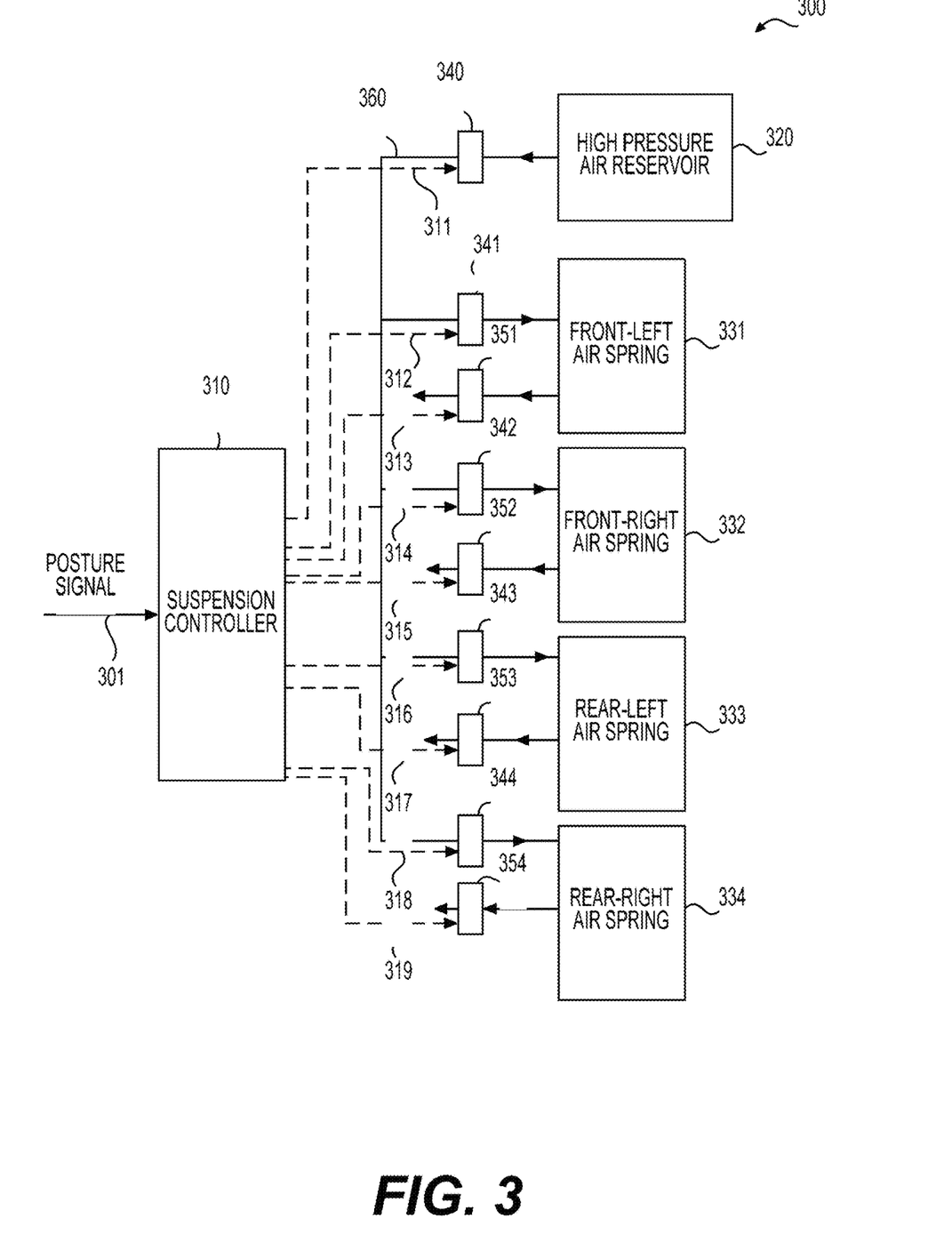
FIG. 3 shows an example air suspension system according to an embodiment of the disclosure.

FIG. 3 shows an example air suspension system 300 according to an embodiment of the disclosure. The air suspension system 300 includes a suspension controller 310, a set of charging solenoid valves 340-344, a set of discharging solenoid valves 351-354, four air springs 331-334, and a high pressure air reservoir 320. The four air springs 331-334 can be disposed at front-right, front-left, rear-right, and rear-left corners of a vehicle chassis, and connect with the high pressure air reservoir 320 through air pipes 360 under regulations of the charging solenoid valves 340-344. In addition, each air spring 331-334 is connected to a discharging pipe regulated by a respective discharging solenoid valve 351-354. The suspension controller 310 can generate actuation signals 311-319 to independently control each of the solenoid valves 340-344, 351-354 to be in an on or off state.

During operation, the suspension controller 310 can receive a posture signal 301 indicating a vehicle posture to-be-created by the suspension system 300, and accordingly generate suitable actuation signals to charge or discharge an air spring. For example, when receiving a posture signal indicating a forward inclined posture, the suspension controller 310 can generate control signals 311, 316, 318 to turn on the solenoid valves 340, 343-344 to charge the two rear air springs 333-334, and generate control signals 315, 315 to turn on the solenoid valves 351-352 to discharge the two front air springs 331-332. As a result, a rear part of the vehicle can be lifted up while a front part of the vehicle can be lowered down. Similarly, corresponding to different posture signals 301, the suspension controller 310 can generate suitable actuation signals to charge or discharge target air springs to create different vehicle postures.

Figure 4:
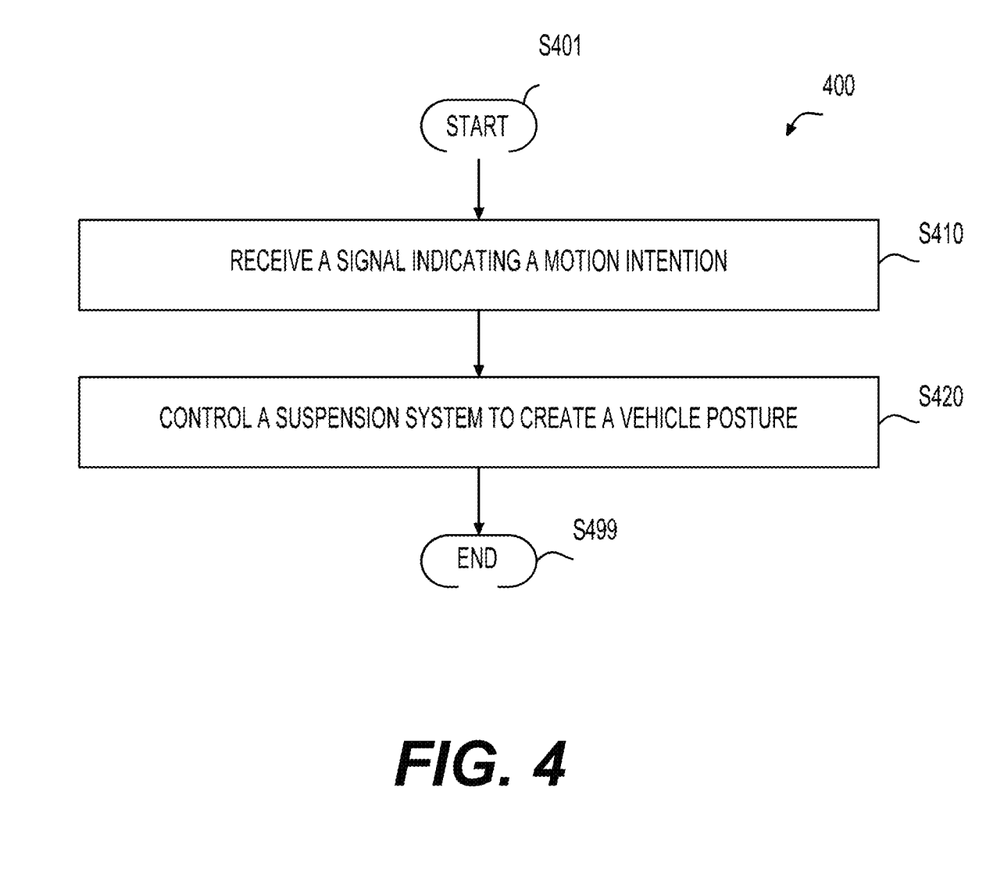
FIG. 4 shows an example process for creating a vehicle posture to convey motion intent of a vehicle to other road users according to an embodiment of the disclosure.

FIG. 4 shows an example process 400 for creating a vehicle posture to convey motion intent of a vehicle to other road users according to an embodiment of the disclosure. The process can be performed by the vehicle posture controller 240 in FIG. 2 example. The vehicle 200 in FIG. 2 is used as an example to explain the process 400. The process 400 can start from S401, and proceed to S410.

At S410, a signal indicating a motion intention of the vehicle 200 can be received. For example, the motion intention signal can be received from the autonomous driving system 210, the driver intention monitoring system 220, or the posture input device 230, and the like.

At S420, a vehicle posture corresponding to the motion intention received at S410 can be created by controlling the suspension system 250 of the vehicle 200. For example, the vehicle posture controller 240 can determine a vehicle posture corresponding to the motion intention, for example, based on a configuration specifying association between vehicle intentions and vehicle postures. Subsequently, the vehicle posture controller 240 can generate a signal 241 indicate the determined vehicle posture. According to the vehicle posture signal 241, a suspension controller of the suspension system 250 can adjust (shrink or extend) one or more suspensions of the suspension system 250 to create the determined vehicle posture. The process 400 can proceed to S499, and terminate at S499.

In various embodiments, the processes and functions described herein can be implemented with hardware, software, or combination thereof. For example, the vehicle posture controller 240 in FIG. 2 can be implemented with one or more integrated circuits (ICs), such as an application specific integrated circuit (ASIC), field programmable gate array (FPGA), and the like. For another example, the functions of the vehicle posture controller 240, or the process 400 can be implemented as software or firmware including instructions stored in a computer readable non-volatile storage media. The instructions, when executed by a processing circuit, causing the processing circuit to perform the functions of the vehicle posture controller 240 or the process 400.

In some examples, the processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving, via circuitry, a signal indicating an intended motion of a vehicle; and
controlling, via the circuitry, a suspension system of the vehicle to create a vehicle posture according to the intended motion of the vehicle to show the intended motion of the vehicle to other road users,
wherein the suspension system of the vehicle is controlled to create the vehicle posture before the intended motion, and the vehicle posture corresponding to the intended motion is determined using artificial intelligence (AI).

2. The method of claim 1, wherein controlling the suspension system of the vehicle to create the vehicle posture includes one of:
creating, via the circuitry, an inclined posture towards the front of the vehicle,
creating, via the circuitry, an inclined posture towards the rear of the vehicle,
creating, via the circuitry, an inclined posture towards the left side of the vehicle,
creating, via the circuitry, an inclined posture towards the right side of the vehicle, and
creating, via the circuitry, a dynamic posture.

3. The method of claim 1, wherein controlling the suspension system of the vehicle to create the vehicle posture includes one of:
creating, via the circuitry, an inclined posture towards the front of the vehicle to show the vehicle intends to stop or keep stopping,
creating, via the circuitry, an inclined posture towards the rear of the vehicle to show the vehicle intends to start,
creating, via the circuitry, an inclined posture towards the left of the vehicle to show the vehicle intends to turn right,
creating, via the circuitry, an inclined posture towards the right of the vehicle to show the vehicle intends to turn left, and
creating, via the circuitry, a dynamic posture including a forward inclined posture followed by a flat posture.

4. The method of claim 1, wherein controlling the suspension system of the vehicle to create the vehicle posture includes one of:
creating, via the circuitry, an inclined posture towards the front of the vehicle by shrinking a front suspension and/or extending a rear suspension of the suspension system,
creating, via the circuitry, an inclined posture towards the rear of the vehicle by shrinking a rear suspension and/or extending a front suspension of the suspension system,
creating, via the circuitry, an inclined posture towards the left of the vehicle by shrinking a left side suspension and/or extending a right side suspension of the suspension system, and
creating, via the circuitry, an inclined posture towards the right of the vehicle by shrinking a right side suspension and/or extending a left side suspension of the suspension system.

5. The method of claim 1, wherein the suspension system is one of:
a suspension system based on airbags,
a hydro-pneumatic suspension system, and
an active suspension system based on high-speed actuators.

6. The method of claim 1, wherein receiving the signal indicating the intended motion of the vehicle includes one of:
receiving, via the circuitry, the signal indicating the intended motion of the vehicle from an autonomous driving system,
receiving, via the circuitry, the signal indicating the intended motion of the vehicle from a driver intention monitoring system, and
receiving, via the circuitry, the signal indicating the intended motion of the vehicle from an input device configured to receive a driver's input of a intended motion.

7. The method of claim 1, wherein controlling the suspension system of the vehicle to create the vehicle posture includes:
extending or shrinking, via the circuitry, a suspension of the suspension system to create the vehicle posture.

8. The method of claim 1, further comprising:
learning combinations of vehicle postures and intended motions using an (AI) device.

9. A vehicle, comprising:
a suspension system; and
a vehicle posture controller configured to,
receive a signal indicating an intended motion of the vehicle, and
control the suspension system of the vehicle to create a vehicle posture according to the intended motion of the vehicle to show the intended motion of the vehicle to other road users,
wherein the suspension system of the vehicle is controlled to create the vehicle posture before the intended motion, and the vehicle posture corresponding to the intended motion is determined using artificial intelligence (AI).

10. The vehicle of claim 9, wherein the vehicle posture controller is configured to control the suspension system of the vehicle to create one of:
an inclined posture towards the front of the vehicle,
an inclined posture towards the rear of the vehicle,
an inclined posture towards the left side of the vehicle,
an inclined posture towards the right side of the vehicle, and
a dynamic posture.

11. The vehicle of claim 9, wherein the vehicle posture controller is configured to control the suspension system of the vehicle to create one of:
an inclined posture towards the front of the vehicle to show the vehicle intends to stop or keep stopping,
an inclined posture towards the rear of the vehicle to show the vehicle intends to start, an inclined posture towards the left of the vehicle to show the vehicle intends to turn right,
an inclined posture towards the right of the vehicle to show the vehicle intends to turn left, and
a dynamic posture including a forward inclined posture followed by a flat posture.

12. The vehicle of claim 9, wherein the vehicle posture controller is configured to perform one of:
controlling the suspension system to shrink a front suspension and/or extend a rear suspension to create an inclined posture towards the front of the vehicle,
controlling the suspension system to shrink a rear suspension and/or extend a front suspension to create an inclined posture towards the rear of the vehicle, controlling the suspension system to shrink a left-side suspension and/or extend a right-side suspension to create an inclined posture towards the left of the vehicle, and controlling the suspension system to shrink a right-side suspension and/or extend a left-side suspension to create an inclined posture towards the right of the vehicle.

13. The vehicle of claim 9, wherein the suspension system is one of:
   a suspension system based on airbags,
   a hydro-pneumatic suspension system, and
   an active suspension system based on high-speed actuators.

14. The vehicle of claim 9, further comprising one of:
   an autonomous driving system configured to generate the signal indicating the intended motion of the vehicle,
   a driver intention monitoring system configured to generate the signal indicating the intended motion of the vehicle, and
   a posture input device configured to receive a driver's input of the intended motion of the vehicle and generate the signal indicating the intended motion of the vehicle.

15. The vehicle of claim 9, wherein the vehicle posture controller is configured to:
   control the suspension system to extend or shrink a suspension of the suspension system to create the vehicle posture.

16. The vehicle of claim 9, further comprising:
   a vehicle posture learning device configured to learn vehicle postures and association between the vehicle postures and intended motions.

17. A non-transitory computer-readable medium storing instructions that, when executed by a processor, causes the processor to perform a method, the method comprising:
   receiving a signal indicating an intended motion of a vehicle; and
   controlling a suspension system of the vehicle to create a vehicle posture according to the intended motion of the vehicle to show the intended motion of the vehicle to other road users,
   wherein the suspension system of the vehicle is controlled to create the vehicle posture before the intended motion, and the vehicle posture corresponding to the intended motion is determined using artificial intelligence (AI).

18. The non-transitory computer-readable medium of claim 17, wherein controlling the suspension system of the vehicle to create the vehicle posture includes one of:
   controlling the suspension system to create an inclined posture towards the front of the vehicle,
   controlling the suspension system to create an inclined posture towards the rear of the vehicle,
   controlling the suspension system to create an inclined posture towards the left side of the vehicle,
   controlling the suspension system to create an inclined posture towards the right side of the vehicle, and
   controlling the suspension system to create a dynamic posture.

19. The non-transitory computer-readable medium of claim 17, wherein controlling the suspension system of the vehicle to create the vehicle posture includes one of:
   controlling the suspension system to create an inclined posture towards the front of the vehicle to show the vehicle intends to stop or keep stopping,
   controlling the suspension system to create an inclined posture towards the rear of the vehicle to show the vehicle intends to start,
   controlling the suspension system to create an inclined posture towards the left of the vehicle to show the vehicle intends to turn right,
   controlling the suspension system to create an inclined posture towards the right of the vehicle to show the vehicle intends to turn left, and
   controlling the suspension system to create a dynamic posture including a forward inclined posture followed by a flat posture.

20. The non-transitory computer-readable medium of claim 17, wherein controlling the suspension system of the vehicle to create the vehicle posture includes one of:
   controlling the suspension system to shrink a front suspension and/or extend a rear suspension of the suspension system to create an inclined posture towards the front of the vehicle,
   controlling the suspension system to shrink a rear suspension and/or extend a front suspension of the suspension system to create an inclined posture towards the rear of the vehicle,
   controlling the suspension system to shrink a left side suspension and/or extend a right side suspension of the suspension system to create an inclined posture towards the left of the vehicle, and
   controlling the suspension system to shrink a right side suspension and/or extend a left side suspension of the suspension system to create an inclined posture towards the right of the vehicle.

21. The method of claim 1, wherein the vehicle posture is different from the intended motion.

22. The method of claim 1, wherein the vehicle is a car, truck, or bus.

23. The method of claim 1, wherein the vehicle is autonomous.

* * * * *